United States Patent [19]
Guyeska et al.

[11] Patent Number: 4,720,776
[45] Date of Patent: Jan. 19, 1988

[54] DC BUS SHORTING APPARATUS AND METHOD FOR POLYPHASE AC INVERTER

[75] Inventors: John C. Guyeska; J. Michael Liptak, both of Columbia; Richard W. Roof, Lexington, all of S.C.

[73] Assignee: Square D Company, Palatine, Ill.

[21] Appl. No.: 9,010

[22] Filed: Jan. 28, 1987

Related U.S. Application Data

[63] Continuation of Ser. No. 677,709, Dec. 4, 1984, abandoned.

[51] Int. Cl.⁴ ............................................. H02M 5/45
[52] U.S. Cl. ....................................... 363/37; 363/138
[58] Field of Search .................. 363/37, 132, 136, 137, 363/138

[56] References Cited

U.S. PATENT DOCUMENTS

| | | | |
|---|---|---|---|
| 3,538,419 | 11/1970 | Seki et al. | 363/138 |
| 4,084,220 | 4/1978 | Akamatsu | 363/37 |
| 4,236,201 | 11/1980 | Okado | 363/138 |
| 4,308,491 | 12/1981 | Joyner et al. | 363/37 |
| 4,328,454 | 5/1982 | Okuyama et al. | 363/37 |
| 4,353,023 | 10/1982 | Kawada et al. | 318/762 |
| 4,426,610 | 1/1984 | Kawada et al. | 318/798 |
| 4,434,393 | 2/1984 | Kobari et al. | 318/762 |
| 4,441,063 | 4/1984 | Roof et al. | 318/722 |
| 4,506,319 | 3/1985 | Akamatsu | 363/138 |
| 4,567,555 | 1/1986 | Matsuse et al. | 363/37 |

FOREIGN PATENT DOCUMENTS

| | | | |
|---|---|---|---|
| 0145581 | 9/1982 | Japan | 363/138 |
| 0170076 | 10/1982 | Japan | 363/138 |
| 0170077 | 10/1982 | Japan | 363/138 |

Primary Examiner—Patrick R. Salce
Assistant Examiner—Jeffrey Sterrett
Attorney, Agent, or Firm—A. Sidney Johnston

[57] ABSTRACT

An inverter for supplying electric alternating current (AC) to a load from a DC source of electric current has a DC bus. The DC bus has a positive conductor and a negative conductor. A plurality of switches are connected to the DC bus, and each of the switches has a conducting state and a nonconducting state. The switches are connected so that electric current may flow from the DC bus through at least one of the switches into the load. Means are provided for switching each of the switches from the nonconducting state into the conducting state at a predetermined time for each of the switches. Means are provided for switchably connecting the DC bus to the DC source of electric current. Means are provided for switchably shorting the positive conductor of the DC bus to the negative conductor of the DC bus in order to interrupt the current flow through the switches and thereby drive the switches into the nonconducting state. Gate turn off thyristors (GTO) such as silicon controlled rectifiers may serve to switchably connect the DC bus to the source of the DC current and also short the positive conductor of the DC bus to the negative conductor. Transistors may also serve as switches to switchably connect the DC bus and to short the bus.

14 Claims, 8 Drawing Figures

DC BUS SHORTING APPARATUS AND METHOD FOR POLYPHASE AC INVERTER

This application is a continuation of application Ser. No. 677,709, filed on Dec. 4, 1984 now abandoned.

FIELD OF THE INVENTION

This invention relates to inverters for converting DC electric current into AC electric current, and more particularly to inverters using electric switches which are driven into a nonconducting state by having the current they conduct interrupted.

BACKGROUND OF THE INVENTION

A longstanding problem in inverter design has been to supply alternating current (AC) to a load from a direct current (DC) source of electric energy while using electric switches which must have their conduction current interrupted in order to drive them into a nonconducting state. Often solid state switches such as thyristors and particularly silicon controlled rectifiers (SCR) are used as switches to switch the DC current into the conductors of the AC load. The switches must be turned on and off in time synchronization with the sinusoidal voltage variations required by an AC load.

A problem arises because of the internal characteristics of solid state switches such as many thyristors, particularly SCRs. SCRs can be turned on by application of a control pulse to a control terminal of the device, and when turned on such a device conducts current between its cathode and its anode. However, the device cannot be switched off except by interrupting the current flow. This switching characteristics of common solid state switches such as SCRs makes it difficult to design circuits to turn the switch off at a specified time. An approach to a solution to AC inverter design is shown in U.S. Pat. No. 4,353,023, issued to Kawada, et al, on Oct. 5, 1982, and is also shown in U.S. Pat. No. 4,434,393, issued to Kobari on Feb. 28, 1984, and also U.S. Pat. No. 4,426,610, issued to Kawada et al on Jan. 17, 1984.

SUMMARY OF THE INVENTION

The invention solves the problem of turning off solid state switches such as thyristors, and particularly SCRs by providing a positive interruption of current flow through the switch. An inverter for supplying electric alternating current (AC) to a load from a DC source of electric current has a DC bus. The DC bus has a positive conductor and a negative conductor. A plurality of switches are connected to the DC bus, and each of the switches has a conducting state and a nonconducting state. The switches are connected so that electric current may flow from the DC bus through at least one of the switches into the load. Means are provided for switching each of the switches from the nonconducting state into the conducting state at a predetermined time for each of the switches. Means are provided for switchably switchably connecting the DC bus to the DC source of electric current. Means are provided for switchably shorting the positive conductor of the DC bus to the negative conductor of the DC bus in order to interrupt the current flow through the switches and thereby drive the switches into the nonconducting state.

An additional beneficial aspect of the invention is that thyristors connected in a regeneration inverter for directing AC current into a load comprising an existing AC electric power line are reverse biased by the AC power line when the positive conductor of the DC bus is shorted to the negative conductor of the DC bus. The reverse bias leads to quicker turn off time for a thyristor by providing a path for recombination by charge carriers stored in the thyristor.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

Figure 1:
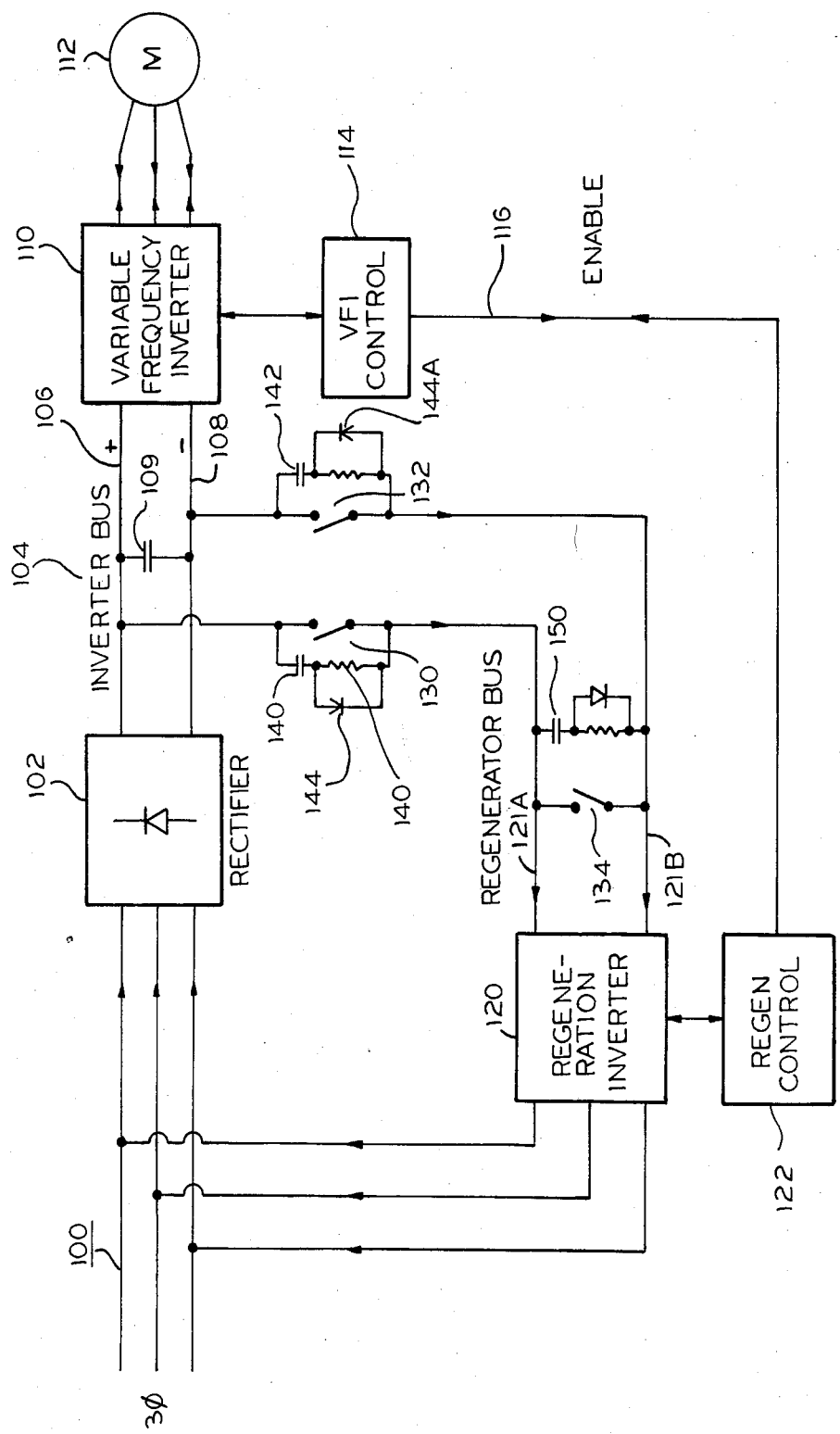
FIG. 1 and FIG. 2 are schematic diagrams, including block representation of functions, of a regenerative inverter system according to the invention.

FIG. 1 shows a 3 phase AC power-line 100 feeding electric current to a rectifier 102 which in turn energizes DC bus 104. DC bus 104 has a positive conductor 106 and a negative conductor 108. Capacitor 109 is connected between conductors 106 and 108 for the purpose of smoothing variations in bus voltage. DC bus 104 supplies DC electric current to variable frequency inverter (VFI) 110. Variable frequency inverter 110 supplies variable frequency AC current to 3 phase AC motor 112. Control of variable frequency inverter 110 is supplied by VFI control 114. Also variable frequency inverter 110 serves as a rectifier under conditions wherein motor 112 functions as a generator.

Motor 112 may function as a generator when it is driven by a load. Under conditions wherein motor 112 functions as a generator, energy flows from motor 112 into DC bus 104, thereby increasing the DC voltage between conductors 106 and 108, and adding charge to capacitor 109. The power flow from motor 112 into DC bus 104 is detected by VFI control 114. Upon detection of power flow from motor 112 into DC bus 104, the VFI control 114 generates an "enable" signal on line 116. The "enable" signal on line 116 commands regeneration inverter 120, through regen control 122, to direct electric current into AC power line 100 from DC bus 104. Regen control 122 commands solid state switches in regeneration inverter 120 to fire at the correct times to deliver electric current into each of the phases of 3 phase power line 100. Current is delivered to 3 phase power line 100 at the times that the phase to neutral voltage is near a maximum, so that the power is delivered to line 100 at approximately unity power factor in each of the phases.

The regeneration inverter 120 is fed by DC regenerator bus 121. Positive conductor 121 A of regenerator bus 121 is connected through switch 130 to positive conductor 106 of inverter bus 104. Negative conductor 121 B of regenerator bus 121 is connected through switch 132 to negative conductor 108 of inverter bus 104.

It is necessary to turn "off", that is to stop the conduction of, the solid state switches in regeneration inverter 120 at predetermined times during the AC cycle. SCRs particularly can be turned "off" only by stopping current flow from their (cathode) to their anode. Switch 130 and switch 132 open so as to disconnect regeneration inverter 120 from DC bus 104 in order to stop conduction of solid state switches in regeneration inverter 120. Switch 134 closes while switches 130 and 132 are open in order to insure that current flow to regeneration inverter 120 from DC bus 104 ceases when switches 130 and 132 are open. The cessation of electric current flow into regeneration inverter 120 causes the solid state switches within regeneration inverter 120 to turn "off,38 or stop conducting, at desired times during the AC cycle of AC power-line 100. Also the solid state switches within inverter 120 are reverse biased when switch 134 closes, thereby insuring their rapid turnoff by providing a discharge path for any charge stored within the solid state switches.

Unwanted current flow into regeneration inverter 120 after switches 130 and 132 open is caused by "snubber" capacitors 140 and 142. Snubber capacitors 140 and 142 tend to charge up to the voltage of DC bus 104 by current flow through regeneration inverter 120, and so tend to maintain current flow for a time duration dependent upon the load current through switches 130, 132 before they open. Capacitors charge up through diodes 144 and 144A. Capacitors 140, and 142 control the rate of change of voltage in the circuit when switches 130, 132 operate thereby protecting switches 130, 132 and other circuit elements. Diode 144 provides a charging path for capacitor 140. The value of capacitance of capacitors 140 and 142 are chosen to keep the rate of change of voltage across switches 130 and 132 within the rated values for switches 130, 132 and other circuit elements.

Thus capacitors 140 and 142 are necessary to protect switches 130 and 132, but also capacitors 140 and 142 are disadvantageous because they prevent switches 130 and 132 from rapidly reducing current flow into regeneration inverter 120 to zero current. Also leakage current flows through switches 130 and 132 when they open, and this leakage current contributes to unwanted current flow into regeneration inverter 120.

Switch 134 closes after switches 130 and 132 open in order to provide a current path for any current flow toward regeneration controller 120. When switch 134 closes it provides a current flow path for both charging of capacitors 140 and 142 and for leakage current through switches 130 and 132. When switch 134 closes all current flow into inverter 120 is rapidly brought to zero and the SCRs in regeneration inverter 120 are reversed biased. As switch 134 opens it is protected by snubber capacitor 150 from high rates of change of voltage. Switch 134 opens before switches 130 and 132 close in order to prevent a direct short across DC bus 104 by switch 134. A complete timing diagram is discussed hereinbelow with reference to FIGS. 3, 4, 5, and 6.

Figure 2:
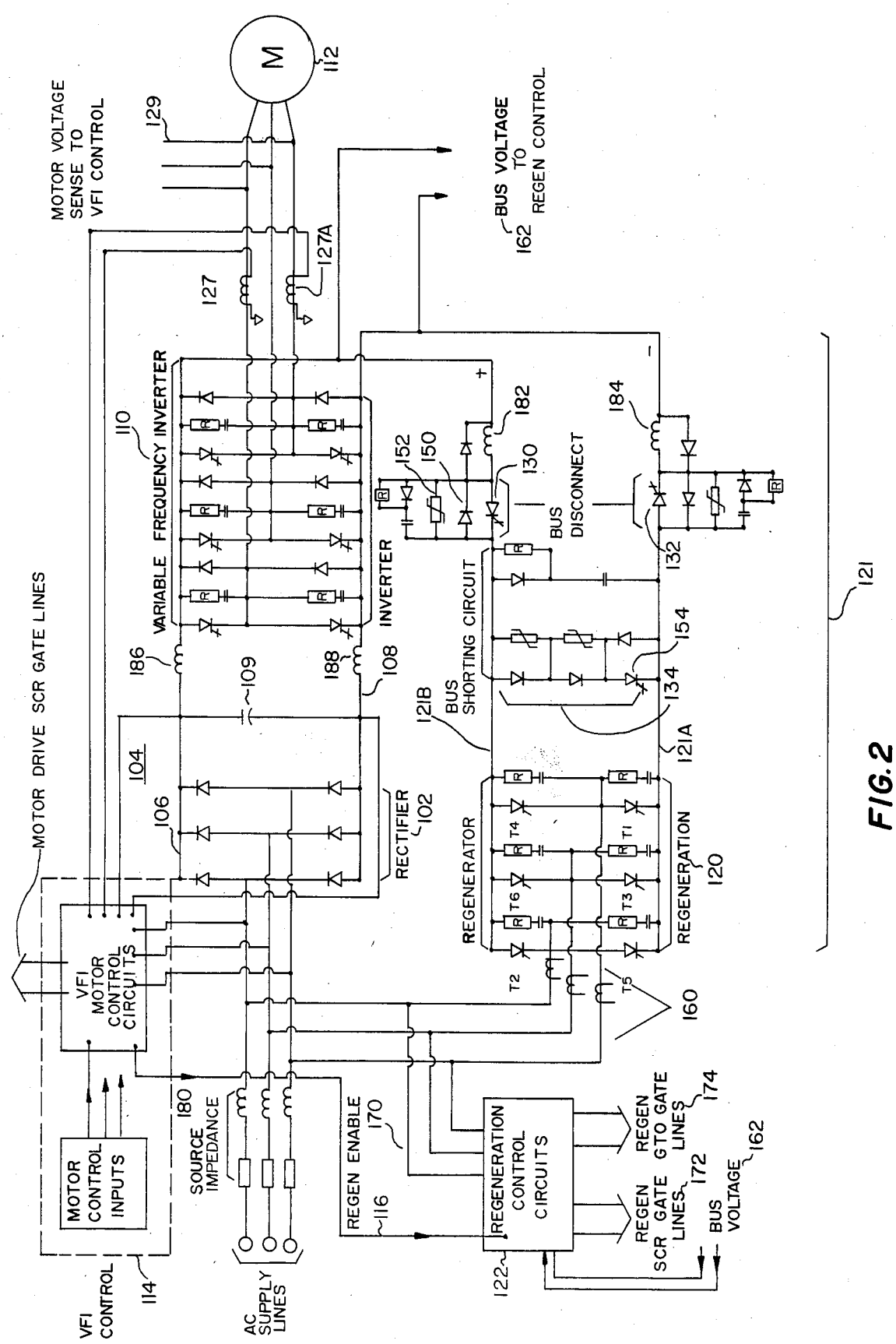

FIG. 2 shows more details of the power flow circuits. Rectifier 102 is made of six solid state diodes in a full wave circuit, and the diodes connect to positive bus conductor 106 and negative bus conductor 108. The variable frequency inverter 110 has solid state switches. The solid state switches can be gate turnoff thyristors or transistors, or other solid state switchable devices. Each solid state switch is protected by a snubber capacitor and resistor.

Each solid state switch has a diode connected across it in anti-parallel. These diodes provide a current path for the conditions where motor 112 requires reactive current or generates electrical power flow into DC bus 104.

VFI control 114 controls the solid state switches of the variable frequency inverter 110. VFI 114 also senses motor current by means of current transformers 127 and 127A, senses motor voltage by lines 129, and generates the regen enable signal on line 116.

Switch 130 is shown in an alternative embodiment as a gate turn off thyristor (GTO) having on anti-parallel connected diode 150. Also an avalanche threshold device 150 such as a Zener diode or a metal oxide varistor (MOV) is connected across the GTO in order to provide further transient voltage protection for the GTO. Switch 132 has a similar embodiment.

Switch 134 is shown in an alternative embodiment as GTO 154. GTO 154 has an anti-parallel connected diode for reverse bias protection, and the GTO and diode are connected in series with diodes. Two diodes are shown because possible DC bus voltages exceed diode voltage ratings, but one higher voltage diode could be used.

The diodes are used to prevent current flow through the GTO in the event that a fault condition results in a voltage reversal of the DC bus.

The regeneration inverter 120 is shown in an alternative embodiment having six thyristors, using SCRs for these thyristors. The thyristor are labelled T1, T2, T3, T4, T5, and T6. Reference to this labelling will be made in a discussion of the timing diagram herein below. Each thyristor is protected by a snubber capacitor and resistor. Current transformers 160 detect current flow in each of the three output phases of regeneration inverter 120, and provide signals to regen control 122. Regen control 122 also senses DC bus 104 voltage on lines 162.

Regen control 122 senses the three phase supply voltages on lines 170, and generates timing pulses based on these voltages to produce firing signals for thyristors T1, T2, T3, T4, T5, and T6, and also to generate firing signals for bus disconnect switches 130 and 132, and bus shorting switch 134. Gate lines from regen control 122 to thyristors T1 through T6 are shown as regen SCR gate lines 172. Gate lines from regen control 122 to switches 130, 132, and 134 are shown as GTO gate lines 174 because the switches may be alternatively gate turn off thyristors (GTO).

Inductances shown in FIG. 2 include those in the source impedance 180. In situations in which the source impedance 180 is too small, that is the power lines, are "stiff," then additional source impedance should be provided in series with the power lines, as with an isolation transformer. The source impedance serves to limit current spikes formed when current flows from DC bus 104 through regeneration inverter 120 and into power lines 100 when the DC bus 104 voltage is considerably greater than the peak line to neutral voltage.

Inductances 182 and 184 serve to increase the time required for the DC current to rise. By increasing the time required for the DC bus 104 current to rise, regen control 122 has sufficient time to open switches 130, 132, and 134 before the fault causes damage to other components of the circuit. Inductances 186 and 188 increase the time required for DC bus 104 current to rise as a result of a fault in the variable frequency inverter 110, motor 112, or other locations. VFI control then has time to sense the fault condition and drive the solid state switches in variable frequency inverter 110 into a non-conductive state.

Figure 3:
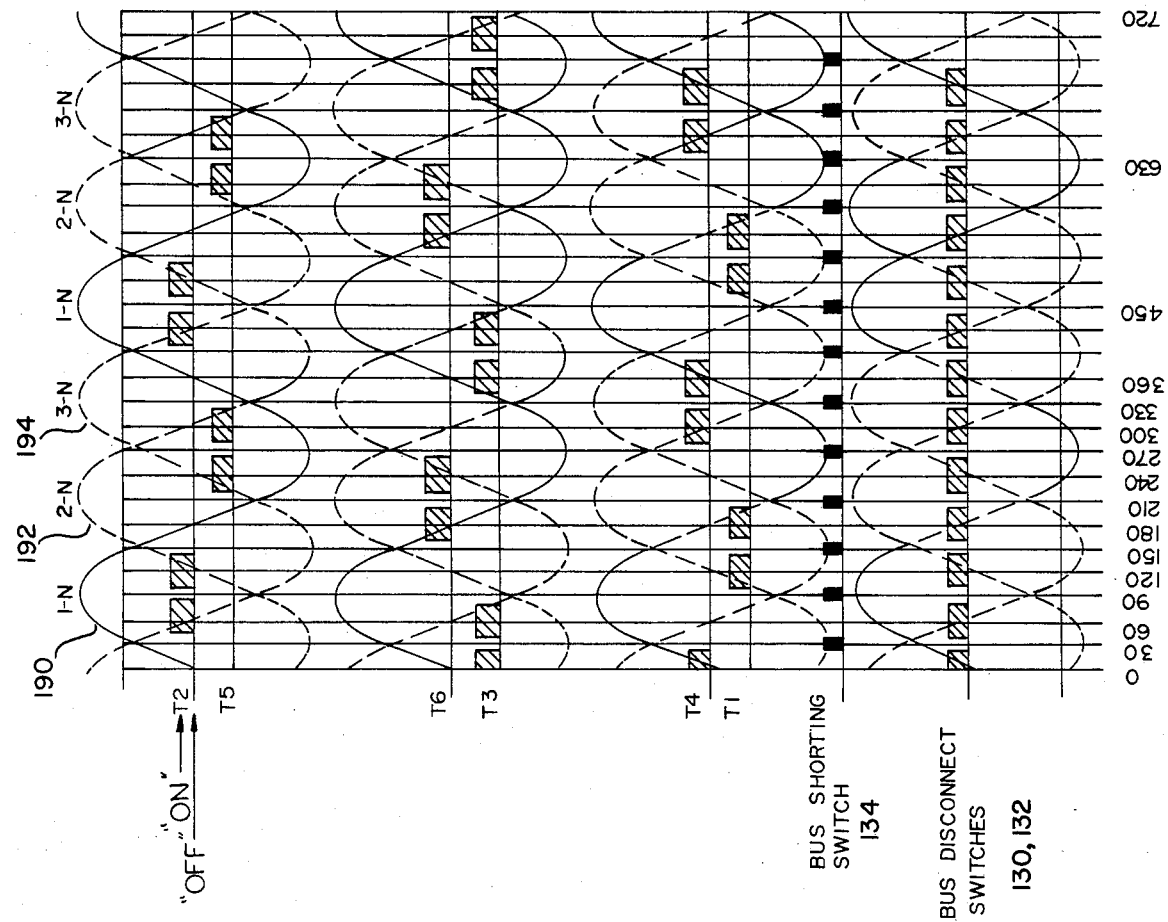
FIG. 3, and FIG. 4 are timing diagrams of an inverter.

FIG. 3 is a timing diagram of the bus disconnect switches 130 and 132, bus shorting switch 134, and thyristors T1 through T6. One of the three phase conductors is chosen as phase 1, one is chosen as phase 2, and the remaining one is chosen as phase 3. Curve 190 shows the phase 1 to neutral voltage, and is labelled 1-N. Curve 192 is labelled 2-N and shows the phase 2 to neutral voltage. Curve 194 is labelled 3-N and shows the phase 3 to neutral voltage. The horizontal axis is marked off in electrical degrees over a range of two cycles, from 0° to 720°. The 0° point is chosen at the zero voltage intercept of the phase 1 to neutral voltage as the voltage passes from negative to positive, as shown by curve 190. The phase 2 to neutral voltage intercepts the zero voltage axis as it rises from negative to positive at 120°, and the phase 3 to neutral at 240°, as shown by curves 192 and 194. Thyristor "on" times are indicated by rectangles located between the "on" time and "off" time, as measured in electrical degrees along the horizontal axis. The thyristor is labelled along the vertical axis of FIG. 3, and the label applies to all of the "on" time rectangles beside the label.

For example, thyristor 2 (T2) is turned "on" at about 35° and turned "off" at about 85°. Thyristor 2 is then turned on again at about 95° and turned off at about 145°. Conduction during these "on" times permits current to flow into phase 1 of the power line at times when the voltage is near its maximum, thereby achieving an approximately unity power factor in regeneration. Thyristor 2 is again sequenced to permit current flow during the positive phase of the next cycle by being turned on at about 395°, turned off at about 445°, and turned on at about 455° and again turned off at about 505°. The dead band of no conduction is near the peak of the AC line cycle, and is centered at 90° on the first cycle and 450° at the second cycle. In an alternative embodiment the dead band may be more nearly 9.5° rather than 10° as indicated above. The dead band is shown in alternative embodiments in FIG. 4.

Thyristor 5 is turned on to conduct during the negative voltage maximum of the phase 1 to neutral voltage, and has a dead band of no conduction centered around 270° for the first cycle and centered around 630° for the second cycle. Thyristor 5, when switched on, permits current flow from phase 1 of the power line into the negative conductor 108 of DC bus 104 during the time that the phase 1 to neutral voltage is going through a negative peak, thereby providing regneration with an approximately unity displacement power factor.

Thyristor 1 is turned "on" at approximately 95° and turned "off" at approximately 145°, and thereby overlaps the conduction time of thyristor 2. With both thyristors 1 and 2 "on" at the same time a complete circuit for current flow exists from the positive DC bus conductor 106 through thyristor 2 into phase 1 of the three phase line 100, out of phase 3 of the line and through thyristor 1 into the negative conductor 108 of DC bus 104.

Current flow from the DC bus 104 into the three phase line may be traced throughout the AC cycle. From 0° to approximately 25° thyristors 3 and 4 are "on" and make a circuit from the positive bus conductor 106 through thyristor 4 into phase 3, through the line and out of phase 2 through thyristor 3, and to the negative bus conductor 108. From approximately 25° to 35° no thyristor is conducting. From approximately 35° to 85° thyristors 3 and 2 are "on" making a circuit from positive bus conductor 106, through thyristor 2 into phase 1 of the line, out of phase 2 of the line through thyristor 3 and into negative bus conductor 108. No thyristors conduct from 85° through 95°. From 95° to 145° thyristors 2 and 1 are "on" providing current flow from positive bus conductor 106 through thyristor 2, into phase 1, and out of the line at phase 3 through thyristor 1 to negative bus conductor 108. Similarly, after each dead band having no thyristors conducting, one of the previously "on" thyristors again turns "on" for the next conduction period, and one new thyristor comes "on", in sequence with the peaks of the three phase voltage wave forms. Table 1 gives the "on" and "off" sequence for the six thyristors, the two bus disconnect switches 130 and 132, and bus shorting switch 134.

TABLE 1

| | TIMING SEQUENCE | | | |
|---|---|---|---|---|
| Angle Electrical Degrees (Approximate) | Positive Bus Thyristor "On" | Negative Bus Thyristor "On" | Bus Disconnect Switches 130,132 | Bus Shorting Switch 134 |
| 0°–25° | 4 | 3 | Off | |
| | Off | Off | Off Off | On |
| 35°–85° | 2 | 3 | Off | |
| | Off | Off | Off Off | On |
| 95°–145° | 2 | 1 | Off | |
| | Off | Off | Off Off | On |
| 155°–205° | 6 | 1 | Off | |
| | Off | Off | Off Off | On |
| 215°–265° | 6 | 5 | Off | On |
| | Off | Off | Off Off | |
| 275°–325° | 4 | 5 | Off | |
| | Off | Off | Off Off | On |
| 335°–385° | 4 | 3 | Off | |
| | Off | Off | Off Off | On |

Figure 4:
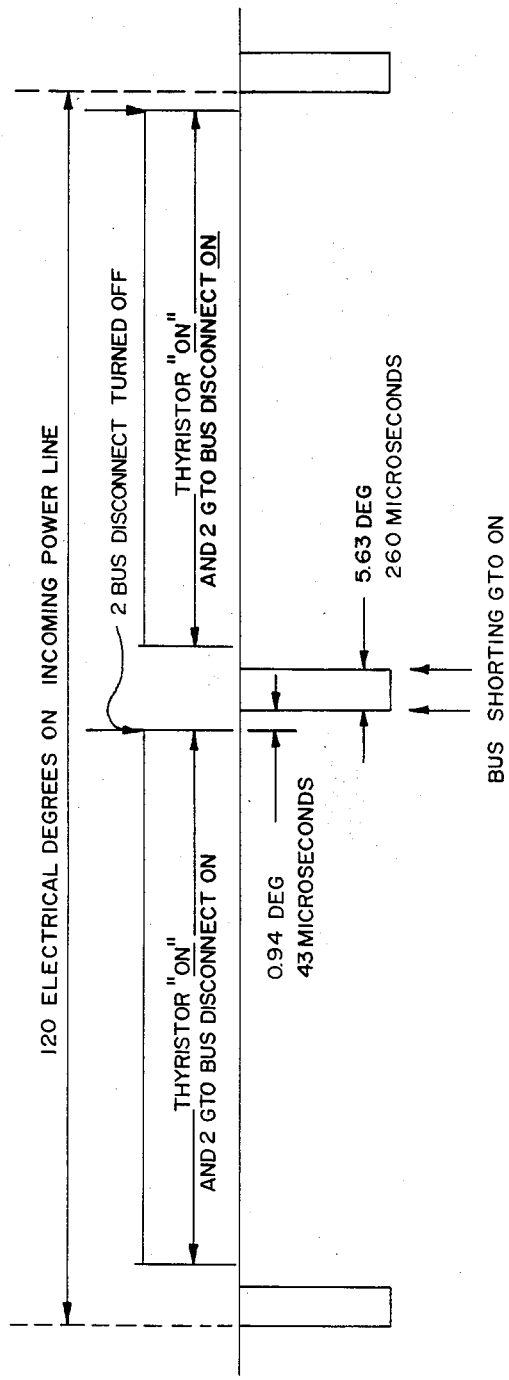

Bus disconnect switches 130 and 132 are "on" during the conduction phase of each thyristor. Bus disconnect switches 130, 132 then open to an "off" condition, and then bus shorting switch 134 closes to an "on" condition, thereby turning off all thyristors which were conducting. In an alternative embodiment the system has been found to work well with bus shorting switch 134 closed for approximately 260 microseconds or 5.63 electrical degrees, and for bus disconnect switches 130, 132 to open approximately 43 microseconds, or 0.94 electrical degrees, earlier and to remain open for approximately 43 microseconds after bus shorting switch 134 opens, as is shown in FIG. 4. This protocol gives a dead time of approximately 7.5 electrical degrees, or 347 microseconds. After the bus disconnect switches 130, 132 are returned to an "on" condition, the two thyristors experiencing phase voltage maxima are switched "on" to complete the circuit from the positive bus conductor 106, through the line 100, and to the negative bus conductor 108.

Alternatively, a protocol having a dead band wherein the bus disconnect switches 130 and 132 are opened, or "off" for approximately 440 microseconds and the bus shorting switch 134 is closed, or "on," for approximately 250 microseconds has been found to perform satisfactorily. The actual time that the bus disconnect switches 130 and 132 are "off" and the bus shorting switch 134 is "on" is subject to adjustment, and is not critical so long as the regeneration bus is shorted for long enough to turn regeneration inventer thyristors T1 through T6 "off".

Figure 5:
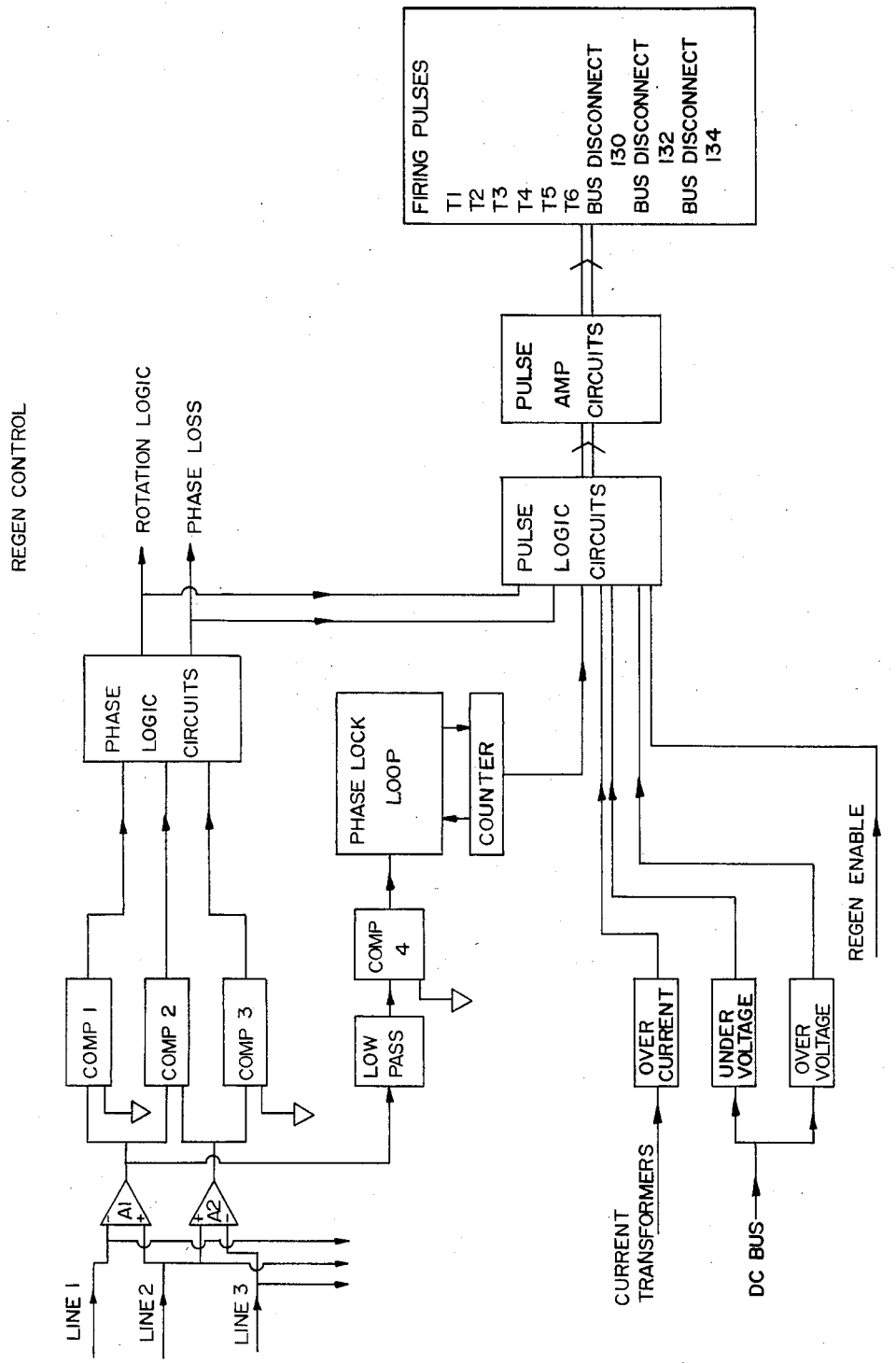
FIG. 5 is a block diagram of a control circuit for an inverter.

FIG. 5 gives a block diagram of regen Control 122. Three phase power line 100 is shown with the individual phases labelled as Line 1, Line 2, and Line 3. Lines 1 and 2 connect to a difference amplifier A1. Difference amplifier A1 produces an analog output proportional to the voltage from line 2 to line 1. Line 2 and line 3 are connected to difference amplifier A2 which produces an output proporational to the line 2 to line 3 voltage. Difference amplifier A1 drives two comparators, comp 1 which generates a logic signal having transitions corresponding to the zero points of the line 2 to line 1 voltage, and comp 2 which has a second input from difference amplifier A2. Difference amplifier A2 drives two comparators, comp 2 which produces an output logic signal with transitions corresponding to the zero voltage points of the line 3 to line 1 voltage, and comp 3 which produces a corresponding logic pulse depending upon the line 2 to line 3 voltage. These logic signals drive "phase logic" circuits. The "phase logic" circuits produce a logic pulse giving the phase rotation sequence, for example a logic "1" for sequence 1-2-3 and a logic "0" for sequence 1-3-2. Also the "phase logic" circuits produce a "phase loss" signal which, for example, becomes logical "1" if the voltage on a phase is lost through a fault.

Also difference amplifier A1 drives a low pass filter which smooths out unwanted rapid variations in the line 2 to line 1 voltage. The low pass filter introduces a time delay in the signal. The low pass filter in turn drives comparator 4 which produces a logic pulse having transition points corresponding to the points in time where the time delayed phase 2 to phase 1 voltage passes through zero voltage. The logic pulse from comparator 4 drives a phase lock loop which locks to these logic pulses. The phase lock loop contains a clock and drives a digital counter. The digital counter drives "pulse logic" circuits. The "pulse logic" circuits also have input from a large number of sources including the rotation logic signal, the phase loss signal, the regen enable signal 116, and inputs from sense circuits such as "over current" sense, "over voltage" sense, and "under voltage sense". The "pulse logic" circuits generate logic pulses to turn each of the thyristors "on", and "off", and the bus shorting switch 134 "on" and "off". The "pulse logic" circuits drive "pulse amplifier" circuits. The "pulse amplifier" circuits generate the actual pulses applied to the various thyristors and switches.

Additionally "pulse logic" circuits halt firing of all switches including regeneration invertor 120 switches such as thyristor T1 through T6 and bus disconnect switches 130 and 132, and bus shorting switch 134 upon detection of certain fault conditions. For example, a short of the DC bus 104 caused by a failure of bus shorting switch 134 to open and turn "off" is detected and all switches, including bus disconnect switches 130 and 132 are locked into the "off" condition. Other fault detection functions of region control 122 are well known to those skilled in the art. Further discussion of a similar pulse generative system is given in U.S. Pat. No. 4,441,063 issued to Roof et al on Apr. 3, 1984, and in U.S. Pat. No. 4,308,491, issued to Joyner Jr. et al. on Dec. 29, 1981.

Figure 6:
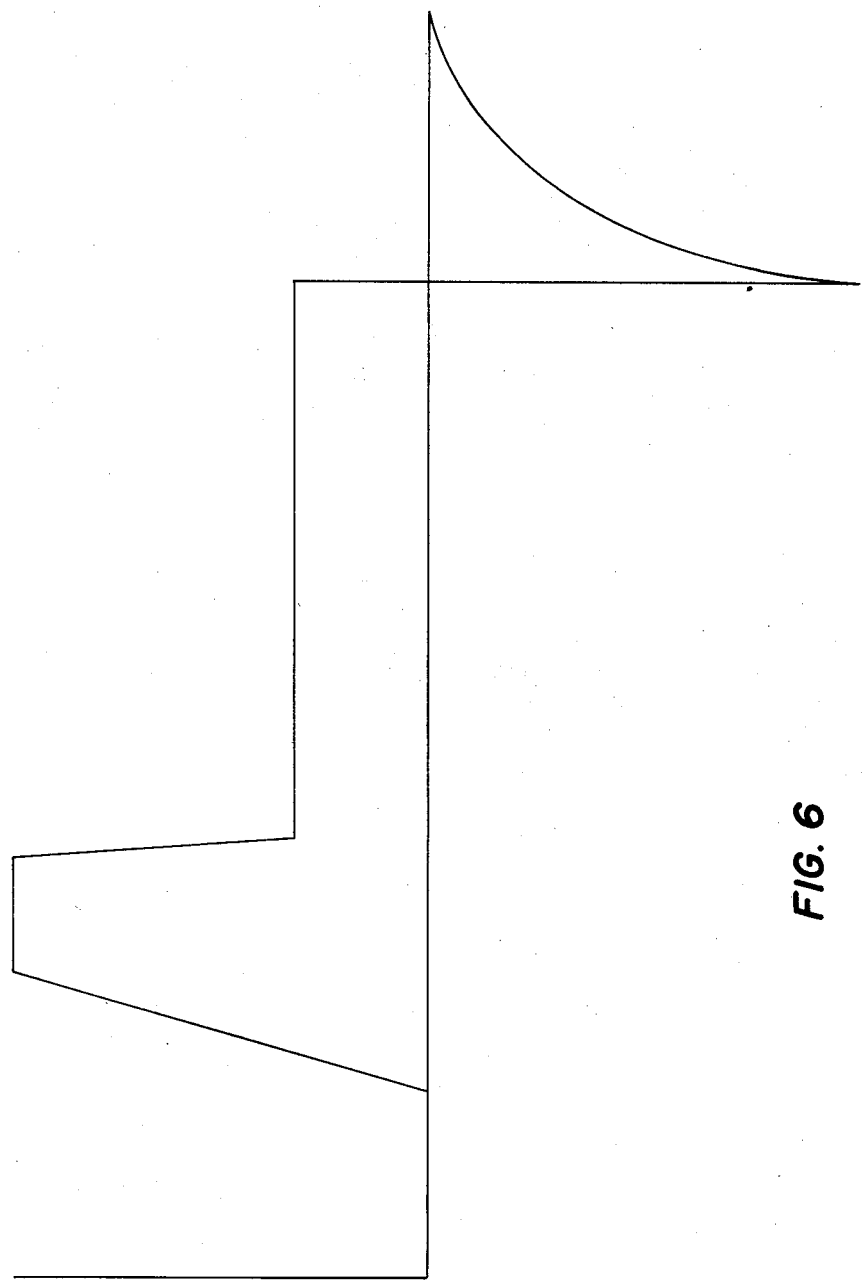
FIG. 6 is a graph of a waveform for controlling a GTO.

It has been found to be satisfactory to use gate turn off thyristors (GTO) for bus disconnect switches 130 and 132, and also for bus shorting switch 134. The pulse amplifiers for the GTO devices must generate pulses to turn the GTO's "on", maintain current in the GTO devices, and then to turn the GTO's "off". A typical wave form for GTO control is shown in FIG. 6. Referring to FIG. 6, the GTO is first given a large control pulse to turn it on rapidly, the control pulse is reduced after the GTO comes on and is maintained until time to turn the GTO off. A negative control pulse is then applied in order to turn the GTO off. The GTO control pulse sequence is well known to those skilled in the art, and the circuits used to generate them are also well known to those skilled in the art.

The circuit functions shown in block diagram herein in this specification are standard circuit functions and are well known to those skilled in the art of electronics.

Sources of gate turn off thyristors which have been found to perform satisfactorily include AEG-Telefunken units identified as GG50A and GG90A, manufactured by AEG-Telefunken Corp., located at D-4788 Warstein-Belecke, West Germany, and also International Rectifier Corp. devices identified as the 160 PFT series and manufactured by International Rectifier Corp., located at 233 Kansas St., El Segundo, Calif.

The correspondence between electrical degrees and time duration as computed in microseconds has been calculated hereinabove on the basis of a 60 hertz AC line frequency where 1° electrical corresponds to approximately 46.3 microseconds. For other AC line frequencies the correspondence between electrical degrees and time duration must be appropriately calculated. For example, for a 50 hertz AC line frequency the correspondence is that 1° electrical is approximately 55.5 microseconds.

The detailed description of the invention has been given hereinabove for a three phase AC electric power line. The invention will work equally well for a general or single phase AC electric power line. The invention is therefore applicable to an inverter designed for any AC electric power line. Also motor 112 may be an AC motor having any convenient number of phases, or may be a DC motor having a pulsed power supply.

As described hereinabove, the inverter drawing DC current through bus disconnect switches 130 and 132 is regeneration inverter 120. However, the inverter drawing DC current through the bus disconnect switches may be used to supply alternating current to any load. For example, the inverter could be used to supply three phase electric alternating current to a motor. As a further example, the load could be an AC motor having any convenient number of phases, or could be a DC motor having a pulsed power supply. Or the inverter could be used to supply electric alternating current to an appropriate load such as a general motor or to an electric power line. Or the inverter could be used to supply single phase electric alternating current to any load, including a single phase motor or a single phase electric power line. Bus shorting switch 134 is useful to stop conduction of solid state switches used in an inverter drawing current through bus disconnect switches 130 and 132.

Figure 8:
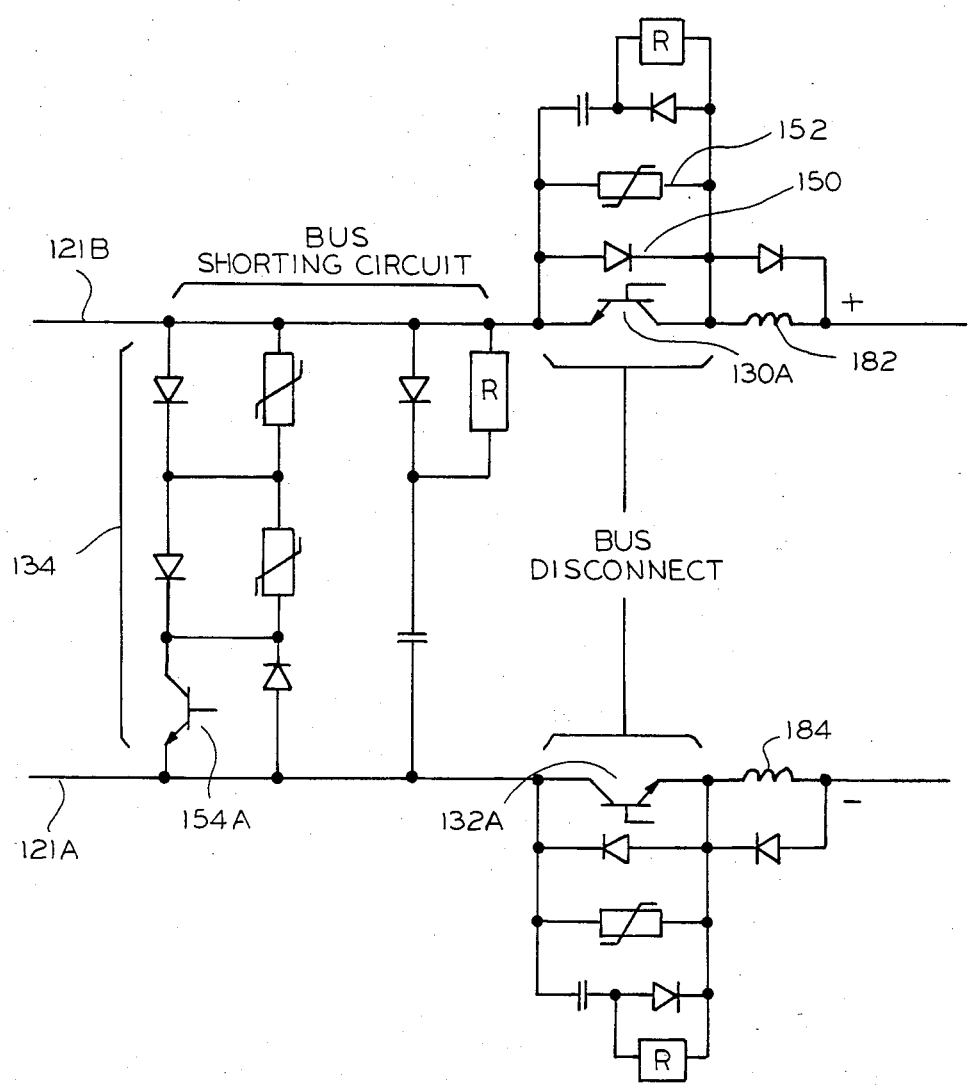
FIG. 8 is a schematic diagram showing transistors used for bus disconnect and bus shorting functions.

Bus disconnect switches 130 and 132 and bus shorting switch 134 may be any electrical switch which can be gated "on" and gated "off" with the necessary speed. One such suitable switch is a gate turn off thyristor. Transistors are a second type of suitable switch. FIG. 8 shows transistors used as bus disconnect switches 130A and 132A, and bus shorting switch 154A. The principal requirement for the switch device is that it be capable of switching the necessary currents in the necessary time periods. Current rise and fall times of a few tens of microseconds are satisfactory. Current carrying capacity of a few hundred amperes is satisfactory for higher horsepower motors in the 50 hp to 100 hp range. Higher current carrying capacity is required for correspondingly higher loads.

Various features of AC inverter designs incorporating the invention disclosed herein are more fully disclosed in the following U.S. patent applications, all of which are assigned to the assignee of the within U.S. Patent application, and all of which are filed on even date with the within application for U.S. patent: "Current Regulated Switching Regulator", Inventor, R. W. Roof, Ser. No. 677,729, Case No. HI-266, all disclosures of which are incorporated herein by reference; "DC Bus Voltage Regulation by Controlling the Frequency in a Variable Frequency Inverter", Inventor, F. C. Joyner, Jr., Ser. No. 677,730. Case No. HI-267, all disclosures of which are incorporated herein by reference; and "Regeneration Detector Circuit", Inventor, J. M. Liptak, Ser. No. 677,785, Case No. HI-268, all disclosures of which are incorporated herein by reference.

Figure 7:
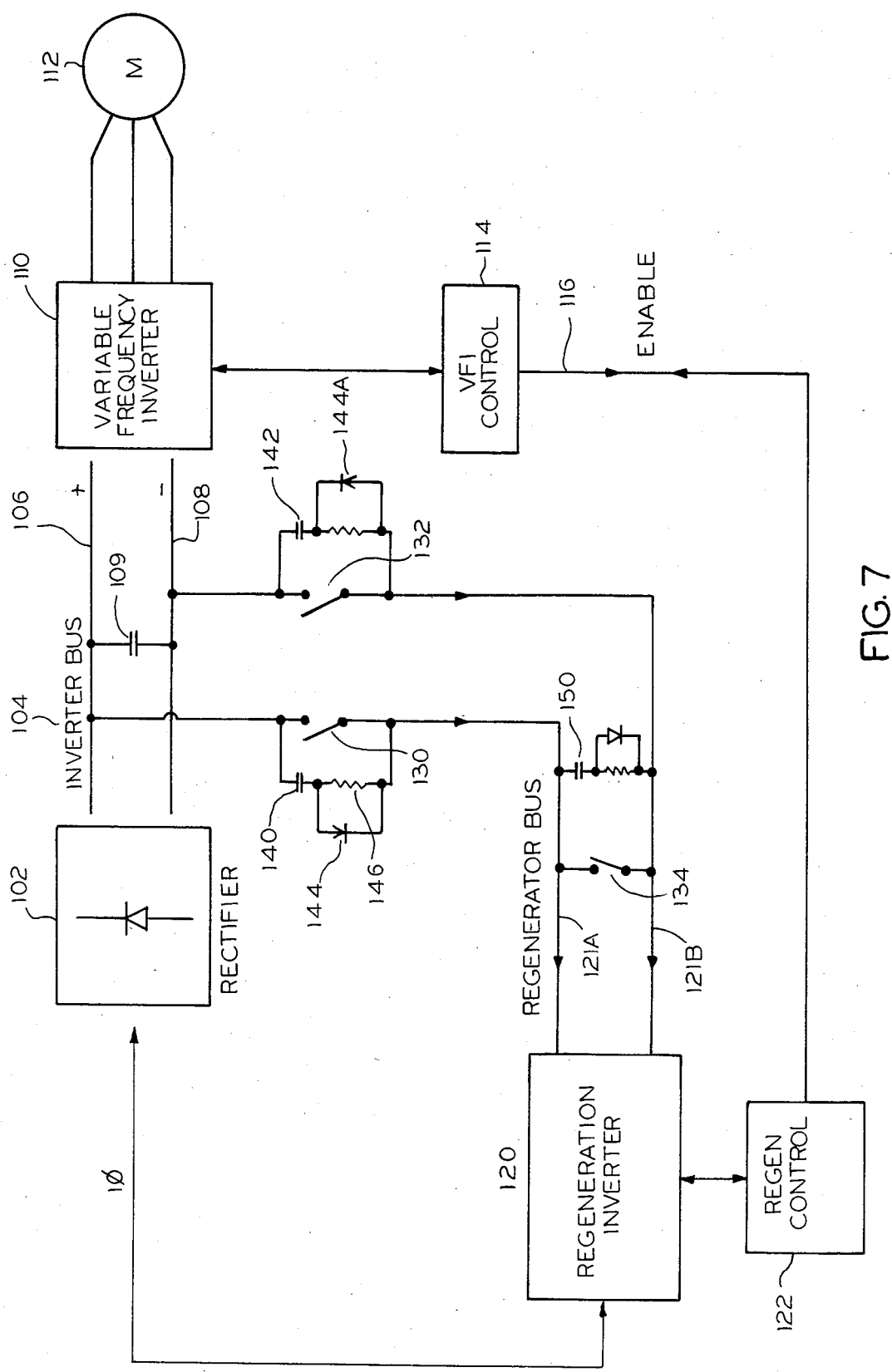
FIG. 7 is a schematic diagram of an inverter operating from a single phase AC power line.

FIG. 7 shows a schematic diagram of an inverter operating from a single phase AC power line 100A.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. An inverter for supplying electric alternating current (AC) to a load, comprising:
   a rectifier energized by an AC power line;
   a first DC bus energized by said rectifier;
   a first plurality of switches for supplying alternating current to said load by switchably connecting said first DC bus to said load, said load capable of supplying electric energy to said first DC bus;
   a second DC bus;
   means for switchably connecting said second DC bus to said first DC bus;
   a second plurality of switches connected to said second DC bus, each one of said second plurality of switches having a conducting state and a nonconducting state, and connected so that electric current may flow from said second DC bus through at least one of said second plurality of switches into said AC power line, whereby said electric energy supplied by said load is directed into said AC power line;
   means for switching each one of said second plurality of switches from said nonconducting state into said conducting state at a predetermined time for each said switch; and,
   means for switchably shorting a positive conductor of said second DC bus to a negative conductor of said second DC bus in order that voltages present on said AC power line reverse bias said switches and thereby assist in extinguishing current flow through said switches.

2. An apparatus as in claim 1 wherein said second plurality of switches comprise thyristors.

3. An apparatus as in claim 1 wherein said second plurality of switches comprise silicon controlled rectifiers.

4. An apparatus as in claim 1 wherein said means for switching each one of said second plurality of switches from said nonconducting state into said conducting state comprises:
   a time sequence generator capable of generating gating signals in time correspondence to voltage variations on said AC power line.

5. An apparatus as in claim 1 wherein said means for switchably connecting said second DC bus to said first DC bus comprises a gate turn off thyristor.

6. An apparatus as in claim 1 wherein said means for switchably shorting said positive conductor of said second DC bus to said negative conductor of said second DC bus comprises a gate turn-off thyristor.

7. The apparatus as in claim 1 wherein said means for switchably connecting said first DC bus to said second DC bus comprises a transistor.

8. The apparatus as in claim 1 wherein said means for switchably shorting said positive conductor of said second DC bus to said negative conductor of said second DC bus comprises a transistor.

9. An apparatus as in claim 1 wherein said means for switching each one of said second plurality of switches from said nonconducting state into said conducting state at a predetermined time is timed so that said second plurality of switches supplies alternating electric current to said AC power line at a predetermined power factor.

10. An apparatus as in claim 9 wherein said predetermined power factor is substantially unity.

11. An improved inverter of the type having
   a rectifier energized by an AC power line,
   a DC bus energized by said rectifier, said DC bus having a positive conductor and a negative conductor,
   a first plurality of switches for supplying alternating current to a load, said load capable of supplying electrical energy to said DC bus,
   wherein the improvement comprises:
   a second plurality of switches connected to said DC bus, each said switch having a conducting state and a nonconducting state, and connected so that electric current may flow from said DC bus through at least one of said second plurality of switches into said AC power line;
   means for switching each said switch of said second plurality of switches from said nonconducting state into said conducting state at a predetermined time for each said switch;
   means for switchably connecting said DC bus to said rectifier; and,
   means for switchably shorting said positive conductor of said DC bus to said negative conductor of said DC bus in order that voltage present on said AC power line reverse bias said switches and thereby extinguish current flow through said switches in synchronization with voltages present on said AC power line.

12. An inverter comprising:

a rectifier energized by an alternating current electric power line;

a first DC bus energized by said rectifier;

a load inverter energized by said first DC bus, said load inverter supplying alternating current to a load, said load capable of supplying electric energy to said first DC bus;

a second DC bus;

means for switchably connecting said second DC bus to said first DC bus;

a regeneration inverter energized by said second DC bus, said regeneration inverter having a plurality of switches, and said regeneration inverter supplying alternating current to said power line by said plurality of switches closing and opening to permit current flow from said DC bus into said power line in synchronization with voltages present on said power line, whereby said electric energy supplied by said load is directed into said power line; and, means for shorting said second DC bus by switching a positive conductor of said second DC bus into electrical connection with a negative conductor of said second DC bus, thereby providing a circuit path for voltages present on said power line to reverse bias selected ones of said plurality of electronic switches within said regeneration inverter.

13. The apparatus as in claim 1, claim 11 or claim 12 wherein said load is a motor.

14. A method for supplying electric current to an alternating current power line from a DC bus supplied by a rectifier energized by said power line, comprising:

gating electrical switches into a conducting state so that electric current flow out of said DC bus into said AC power line at predetermined times through a positive conductor of said DC bus and through a negative conductor of said DC bus;

shorting said positive conductor of said DC bus to said negative conductor of said DC bus in order that voltages on said power line reverse bias said switches in order to interrupt the current flow through said switches in synchronization with voltages on said power line.

* * * * *